(12) United States Patent
Ng

(10) Patent No.: US 7,902,796 B2
(45) Date of Patent: Mar. 8, 2011

(54) BATTERY EQUALIZATION CHARGING METHOD AND APPARATUS

(76) Inventor: Man Oi Cleo Ng, Tuen Mun (HK)

( * ) Notice: Subject to any disclaimer, the term of this patent is extended or adjusted under 35 U.S.C. 154(b) by 807 days.

(21) Appl. No.: 11/858,582

(22) Filed: Sep. 20, 2007

(65) Prior Publication Data
US 2008/0303485 A1 Dec. 11, 2008

(30) Foreign Application Priority Data

Jun. 11, 2007 (CN) .......................... 2007 1 0109975

(51) Int. Cl.
*H02J 7/00* (2006.01)
*H02J 7/16* (2006.01)

(52) U.S. Cl. ......... 320/160; 320/162; 320/132; 320/133; 320/134; 320/150

(58) Field of Classification Search .................... 320/160
See application file for complete search history.

(56) References Cited

U.S. PATENT DOCUMENTS

| 5,498,950 | A | * | 3/1996 | Ouwerkerk | .................... | 320/119 |
| 5,850,136 | A | * | 12/1998 | Kaneko | ......................... | 320/119 |
| 5,889,385 | A | * | 3/1999 | Podrazhansky et al. | ...... | 320/130 |
| 6,225,786 | B1 | * | 5/2001 | Muramatsu et al. | .......... | 320/150 |
| 2006/0103351 | A1 | * | 5/2006 | Tanigawa et al. | ............. | 320/118 |

* cited by examiner

*Primary Examiner* — Edward Tso
*Assistant Examiner* — Yalkew Fantu
(74) *Attorney, Agent, or Firm* — J.C. Patents

(57) ABSTRACT

The present invention discloses a charging method for equalization charging a battery array consisting of at least two cells, comprising the following steps: (a) charging the cells of the battery array with a constant charging current; (b) detecting the cell voltages of the individual cells to judge whether some of the cell voltages have reached a pre-set safe reference voltage; (c) repeating the step (a) when determining that none of the cell voltages has reached the safe reference voltage, or maintaining at least one of the cell voltages at the safe reference voltage and reducing the charging current at the same time when determining that said at least one of the cell voltages has reached the safe reference voltage; (d) judging whether all of the cell voltages have reached the safe reference voltage when the charging current is reduced to a pre-set minimum charging current; and (e) reducing the charging current continuously below the minimum charging current and then terminating the charging operation when determining that all of the cell voltages have reached the safe reference voltage. The present invention also discloses a charging apparatus carrying out the above method.

18 Claims, 5 Drawing Sheets

BATTERY EQUALIZATION CHARGING METHOD AND APPARATUS

CROSS-REFERENCE TO RELATED APPLICATION

This application claims priority benefit of Chinese patent application No. CN200710109975.8 filed on Jun. 11, 2007, the content of which is hereby incorporated by reference in its entirety.

FIELD OF THE INVENTION

The present invention relates to the field of a battery charging method and apparatus, in particular to a method and apparatus for equalization charging a battery array consisting of a plurality of cells connected in series, which could equalize the cell voltages of the cells and prevent the over-charging and/or under-charging of each cell. This invention is well suitable for heavy duty rechargeable Lead acid batteries, particularly ideal for new generation Calcium batteries.

BACKGROUND OF THE INVENTION

With the development of the society, more and more electrical apparatuses use rechargeable batteries as power supply for the convenience of users. According to different desired power, the power supply voltages of most electrical apparatuses are in a range of 6V-120V. For example, the power supply voltage of an electrical bicycle is about 36V, which is supplied by a battery array consisting of 6 series-connected cells with a cell voltage of 6V or 3 series-connected cells with a cell voltage of 12V. When the cell voltages of the cells are low, the cells should be charged. If each cell is charged separately, a large mount of charging apparatuses and/or charging time are needed. Therefore, a battery charger with a charging voltage of 36V is usually used to charge the whole battery array at the same time. Presently, most of battery chargers available in the market only have two input/output leads, which are connected to the positive and negative terminals of the battery array. Such battery chargers could only control the total voltage of the battery array, thus, the cell voltages of individual cells would be unequal due to the discreteness of the cells occurred during the manufacture of the cells and unequalization of the cells occurred after several times of use. When the cell voltage of a certain cell is too high, the cell would be over-charged, and the electrolyte contained in the cell would be degraded, which may result in the rising of the temperature and pressure within the cell and the rapid degradation of the cell. On the other hand, when the cell voltage of a certain cell is too low, the cell would be under-charged. This would certainly cause the discrepancy of efficiency and life span of respective cells in the battery array, and even cause some cells to be inefficient before the other cells.

Facing to the above-mentioned questions in the prior arts, a charging apparatus and method is desirable, which could monitor the cell voltages of the individual cells while supplying electric energy to the battery array, to regulate the charging current and charging mode for the battery array according to the result of monitoring the cell voltages. Therefore, the equalization of the cell voltages of the individual cells could be realized during the charging operation, and the over-charging or under-charging of any cells could also be avoided, thus, the life span of the whole battery array could be extended.

SUMMARY OF THE INVENTION

The object of the present invention is to provide a charging method for equalization charging a battery array consisting of at least two cells, comprising the following steps: (a) charging the cells of the battery array with a constant charging current; (b) detecting the cell voltages of the individual cells to judge whether some of the cell voltages have reached a pre-set safe reference voltage; (c) repeating the step (a) when determining that none of the cell voltages has reached the safe reference voltage, or maintaining at least one of the cell voltages at the safe reference voltage and reducing the charging current at the same time when determining that the at least one of the cell voltages has reached the safe reference voltage; (d) judging whether all of the cell voltages have reached the safe reference voltage when the charging current is reduced to a pre-set minimum charging current; and (e) reducing the charging current continuously below the minimum charging current and then terminating the charging operation when determining that all of the cell voltages have reached the safe reference voltage.

The step (e) may further comprise raising the charging current suitably when determining that at least one of the cell voltages has not reached the safe reference voltage. Preferably, the method may further comprise the following steps: (f) charging the battery array with the raised charging current in a constant current manner or a pulse current manner; (g) judging whether all of the cell voltages have reached the safe reference voltage; and (h) reducing the charging current continuously below the minimum charging current and then terminating the charging operation when determining that all of the cell voltages have reached the safe reference voltage.

The step (h) may further comprise judging whether at least one of the cell voltages has reached a pre-set maximum safe reference voltage when determining that not all of cell voltages have reached the safe reference voltage. Preferably, the method further comprises the following step: (i) repeating the step (f) when determining none of the cell voltages has reached the maximum safe reference voltage.

Preferably, the method may further comprise the following step: (j) reducing the raised charging current to maintain the at least one of the cell voltages which has reached the maximum safe reference voltage at the maximum safe reference voltage and then repeating the step (g) when determining that none of the cell voltages has exceeded the maximum safe reference voltage, and terminating the charging operation forcibly when determining that at least one of the cell voltages has exceeded the maximum safe reference voltage.

In addition, the method may further comprise the following step: counting the charging time of the whole charging operation and/or several individual stages of the charging operation, and regulating the charging operation forcibly according to the charging condition of the individual cells when the charging time has reached a pre-set charging time threshold value.

In addition, the method may further comprise the following step: detecting the temperature of the battery array and comparing the detected temperature with a pre-set temperature value, and terminating the charging operation when determining that the detected temperature has exceeded the pre-set temperature value.

The present invention further provides a charging apparatus for equalization charging a battery array consisting of at least two cells, which may comprise: a charging power supply for supplying electric energy to the battery array; a plurality of voltage signal detection leads; and a controller which is connected to the charging power supply and is connected to the respective cells of the battery array via the voltage signal detection leads to detect the cell voltages of the respective cells during the charging operation, in which a safe reference voltage and a maximum safe reference voltage are pre-set in the controller, and the controller compares the detected cell voltages with the safe reference voltage and the maximum safe reference voltage, to control the charging power supply and in turn control the charging operation according the result of the comparison.

Preferably, the control of the controller to the charging power supply may comprise: maintaining at least one of the cell voltages at the safe reference voltage and reducing the charging current at the same time when determining that the at least one of cell voltages has reached the safe reference voltage; and commanding the charging power supply to raise the charging current suitably and charge the battery array with the raised charging current in a constant current manner or a pulse current manner when the charging current is reduced to a pre-set minimum charging current and not all of cell voltages have reached the safe reference voltage.

In addition, the control of the controller to the charging power supply may further comprise: commanding the charging power supply to reduce the charging current continuously below a pre-set minimum charging current and then terminating the charging operation when determining that all of the cell voltages have reached the safe reference voltage; and commanding the charging power supply to reduce the charging current to maintain at least one of the cell voltages at the maximum safe reference voltage when determining that the at least one of the cell voltages has reached the maximum safe reference voltage.

In addition, the control of the controller to the charging power supply may further comprise: commanding the charging power supply to terminate the charging operation immediately when determining that at least one of the cell voltages has exceeded the maximum safe reference voltage.

Preferably, the controller further comprises a timer, the timer may count the charging time of the whole charging operation and/or several individual stages of the charging operation, and the controller regulates the charging operation forcibly according to the comparison result between the charging time and a pre-set charging time threshold value.

In addition, the apparatus may further comprise a temperature sensor, the temperature sensor is provided near the battery array to monitor the temperature of the battery array during the charging operation.

With the charging method and apparatus of the present invention, cell voltage equalization of the cells could be realized during the charging operation. Therefore, it could avoid that some cells are under-charged while some cells are over-charged, and then the life span of the whole battery array could be extended.

BRIEF DESCRIPTION OF THE DRAWINGS

The present invention will be described in detail with reference to the accompanying drawings, in which.

DETAILED DESCRIPTION OF THE INVENTION

Figure 5:
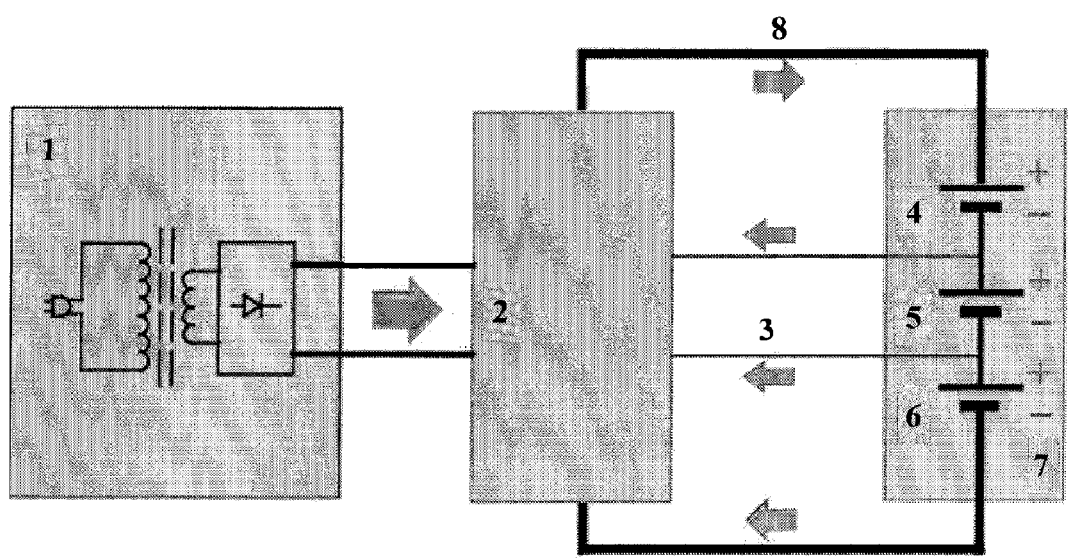
FIG. 5 is a schematic diagram illustrating the connection between a battery array and the charging apparatus according to the present invention.

As shown in FIG. 5, the charging apparatus of the present invention comprises a charging power supply 1 for supplying electric energy to a battery array 7 consisting of at least two cells, a controller 2 for controlling the charging operation, and a plurality of voltage signal detection leads 3 for connecting individual cells to the controller 2 to detect the cell voltage of each cell. The charging power supply may be a combination of a transformer and a rectifier, which could transform and rectify the voltage of AC input (100-230V) to supply desired charging energy to the battery array. Of course, the charging power supply may also be any other controllable power supply known in the field.

The battery array 7 is connected to the charging apparatus via the voltage signal detection leads 3 and main charging circuit 8, and the battery array 7 may comprise a plurality of series-connected cells. As shown in FIG. 5, the battery array 7 includes three series-connected cells, i.e. a first cell 4, a second cell 5 and a third cell 6. Of course, the battery array could consist of more series-connected cells. Both terminals of each cell are connected to the controller 2 via the voltage signal detection leads 3 for the controller 2 detecting the cell voltage of respective cell. In the example shown in FIG. 5, the voltage signal detection leads are only provided between the cells 4 and 5 and between the cells 5 and 6, which is enough to detect the cell voltages of the three cells together with the main charging circuit. Most preferably, the charging apparatus comprises analog-to-digital converters, to convert the cell voltage of each cell to a digital signal.

A safe reference voltage and a maximum safe reference voltage are preset in the controller 2. The safe reference voltage is a charging voltage value preset for each cell, which is the cell voltage of each cell upon being fully charged. The maximum safe reference voltage corresponds to a maximum cell voltage which the cells could bear upon being fully charged but not being over charged. According to the type of the cells and their present conditions, the safe reference voltage and the maximum safe reference voltage may be adjusted. For example, for some typical Lead acid WET batteries from the battery manufactures, the safe reference voltage is set at 14.4V, and the maximum safe reference voltage is set at 14.7V in the charging stages. If the battery charging voltage is between 14.4V and 14.7V, the battery would be fully charged without overcharging at the meantime. The controller 2 will compare the cell voltage signals of the individual cells with the safe reference voltage and/or the maximum safe reference voltage, and control the charging power supply 1 according to the result of the comparison. The controller 2 may be a single-chip microcomputer or a DSP chip, and each of the charging steps in the present charging method may be controlled by a software stored in the single-chip microcomputer or DSP chip.

The controller 2 may further comprise a timer (not shown in FIG. 5). The timer may count the charging time of the charging operation, thus, when the controller determines that the charging time has reach a maximum charging time threshold value pre-set in the controller, it will force the charging power supply to terminate the charging operation, even if some of the cells are not fully charged. This will prevent the cell from being charged for a long time due to the large discrepancy among the cells, and in turn prevent the continuous degradation (over-charging or under-charging) of the cells in normal condition.

In addition, the charging apparatus may further comprise one or more temperature sensors (not shown in FIG. 5). The temperature sensor is provided near the cells, to detect the temperature of the cells during the charging operation. The temperature sensor communicates with the controller 2 to input the temperature of the cells to the controller 2. An upper limit temperature value may be pre-set in the controller 2 for the comparing with the temperature of the cells. Thus, the controller 2 could control the charging operation according the individual temperature of each cell, to avoid the damage of the cells due to high temperature of the cells. This could also prevent the cells being charged for a long time due to the large discrepancy among the cells, and in turn present the continuous degradation (over-charging or under-charging) of the cells in normal condition.

Figure 1:
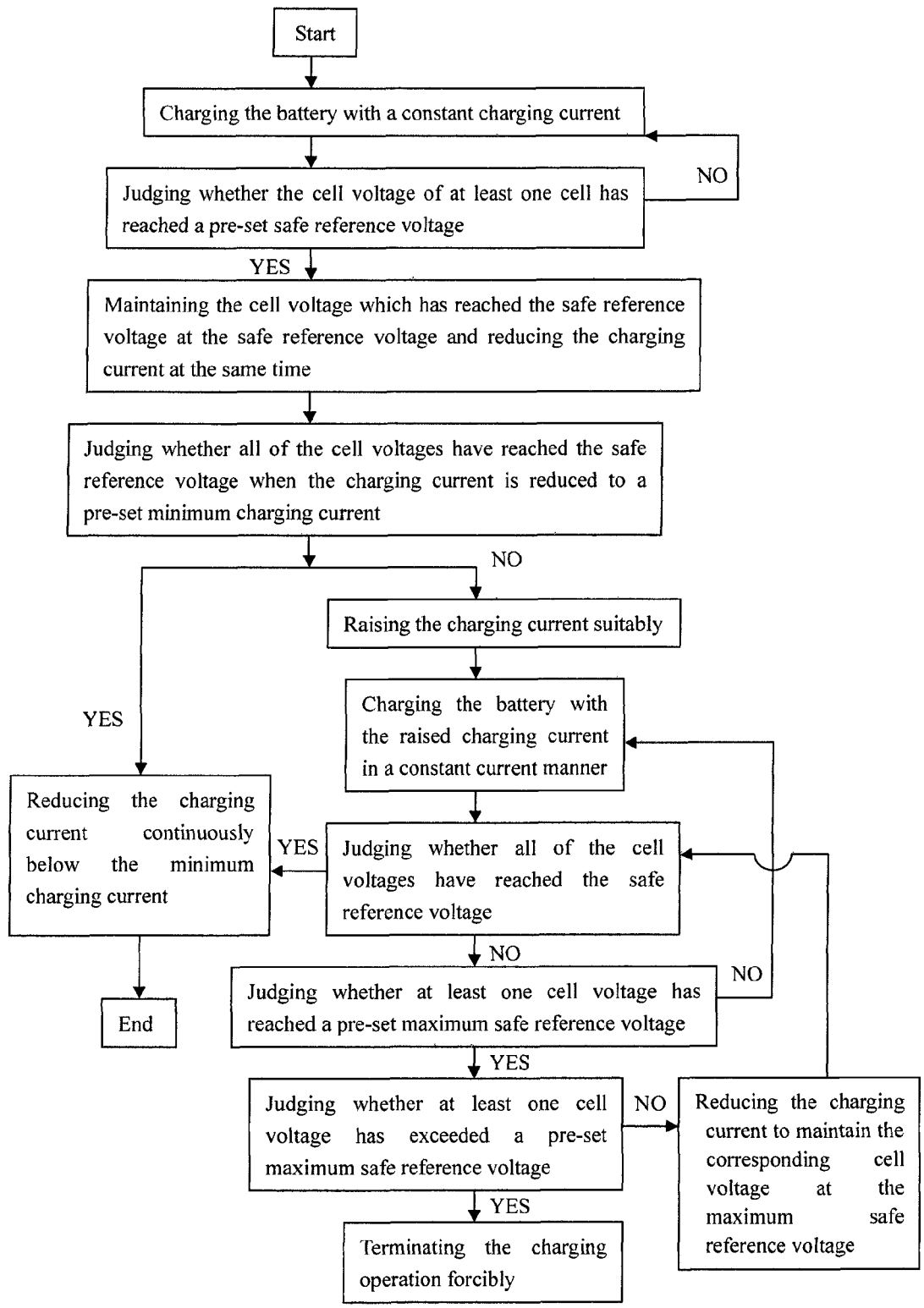
FIG. 1 is a flow diagram of the first embodiment of the charging method according to the present invention.

Next, the first embodiment of the present charging method will be described in detail with reference to FIGS. 1 and 2.

Firstly, the battery array 7 is connected to the charging apparatus, and the charging power supply is turned on, thus, the charging power supply starts to charge the battery array via the main charging circuit 8 with a constant charging current. Then, the controller 2 begins to detect the cell voltage V of each cell via the voltage signal detection leads 3, and compare the detected cell voltages with the pre-set safe reference voltage V1, to judge whether some of the cell voltages have reached the safe reference voltage. If the controller determines that none of cell voltages has reached the safe reference voltage, it will command the charging power supply to continue charging the battery array with the constant charging current. If the controller determines that the cell voltage of certain cell or cells has reached the safe reference voltage, it will maintain the cell voltage of the certain cell or cells at the safe reference voltage, and reduce the charging current in the main charging circuit 8 at the same time to continue charging the battery array 7. A minimum charging current could be pre-set in the controller 2. When the controller determines that the charging current is reduced to the minimum charging current, it will further judge whether the cell voltages of the other cells have reached the safe reference voltage. If the controller 2 determines that all of cell voltages have reached the safe reference voltage, it will indicate the charging power supply to continue reducing the charging current I until the charging current is below the minimum charging current, and then command the charging power supply to terminate the charging operation.

Figure 2:
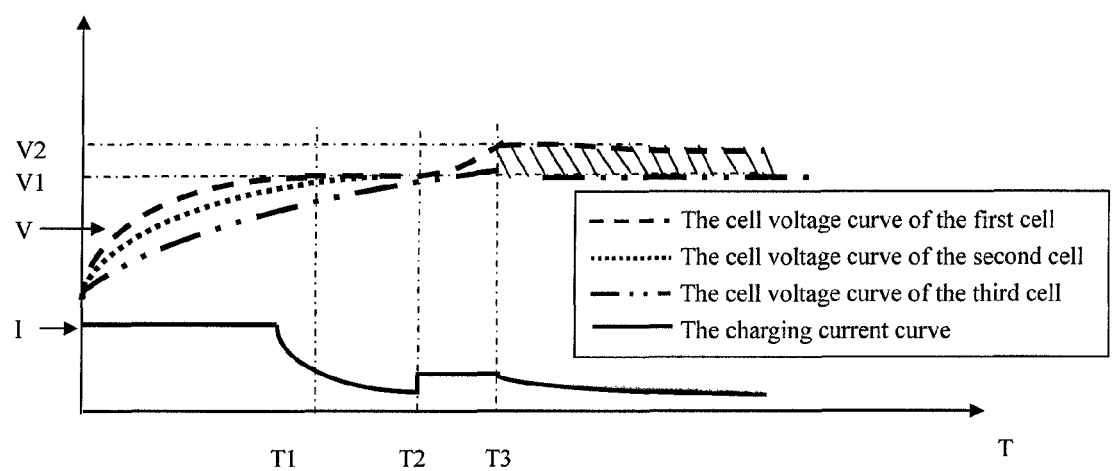
FIG. 2 is a plot illustrating the relation between the cell voltages of the cells and the charging current in the charging method shown in FIG. 1.

FIG. 2 illustrates an example of the charging method of the present invention. At the time T1, the controller 2 determines that the cell voltage of the first cell 4 has reached the safe reference voltage, and that the cell voltages of the second and third cells 5 and 6 have not reached the safe reference voltage, then the controller 2 will maintain the cell voltage of the first cell 4 at the safe reference voltage and reduce the charging current at the same time.

When the charging current is reduced to the pre-set minimum charging current, the controller will further judge whether the cell voltages of all cells have reached the safe reference voltage, in which the minimum charging current is pre-set in the controller according to the characteristic of the cells, or the regulation rate of the charging current could be pre-set at a constant value. If the controller determines that the cell voltages of all cells have reached the safe reference voltage, it will command the changing power supply to reduce the charging current continuously until the charging current is below the minimum charging current, to terminate the charging operation.

However, if the controller determines that not all cell voltages have reached the safe reference voltage at this time, the controller will command the charging power supply to raise the charging current suitably, and the charging power supply will use the raised charging current to charge the battery array continuously in a constant current manner. As mentioned above, the change rate of the charging current could be a constant, thus, the charging current could be raised by a constant change rate. As shown in FIG. 2, at the time T2, the controller determines that the cell voltage of the third cell 6 has not reached the safe reference voltage, thus the controller commands the charging power supply to raise the charging current suitably, and the charging power supply uses the raised charging current to charge the battery array continuously in a constant current manner.

During the period of charging the battery array with the raised charging current, that is, during the period from time T2 to T3, the controller will continuously compare the cell voltages of the cells with the safe reference voltage, and judge whether the former has reached the latter. If yes, the controller will indicate the charging power supply to reduce the charging current step by step until the charging current is below the above-mentioned lower limit charging current, and then to terminate the charging operation. Otherwise, the controller will judge whether the cell voltage of at least one cell has reached the maximum safe reference voltage V2.

If the controller 2 determines that none of none of cell voltages has reached the maximum safe reference voltage, it will command the charging power supply 1 to use the above-mentioned raised charging current to charge the battery array continuously in a constant current manner. If the controller 2 determines that the cell voltage of at least one cell has reached the maximum safe reference voltage, it will further judge whether the above cell voltage has exceeded the maximum safe reference voltage. If the controller 2 determines that the above cell voltage has exceeded the maximum safe reference voltage, the controller will force the charging power supply to terminate the charging operation immediately.

At this moment, if the controller determines that the above cell voltage has not exceeded the maximum safe reference voltage V2, it only shows that the corresponding cell is in risk of being over-charged, thus, the controller will command the charging power supply to reduce the charging current immediately, to maintain the cell voltage of the corresponding cell at the maximum safe reference voltage. Therefore, the corresponding cell is protected from being damaged.

As shown in FIG. 2, at the time T3, if the controller 2 determines that all cell voltages of the three cells have reached the safe reference voltage, the controller will command the charging power supply 1 to reduce the charging current step by step, and then to terminate the charging operation. Therefore, from the time T3 to the end of the charging operation, all cell voltages could be controlled in the range from the safe reference voltage to the maximum safe reference voltage, to ensure that none of the cells is under-charged or over-charged, even if the characteristics of the cells are different from each other.

Furthermore, the controller could time the whole of the charging operation and/or the individual stages of the charging operation by using a timer, so that when the charging time has reached a corresponding charging time threshold value pre-set in the controller, the controller would forcibly regulate the charging operation according to the charging condition of the individual cells.

For example, the timer may count the charging time of the whole charging operation from the beginning thereof, and when the controller determines that the charging time has reached the pre-set maximum charging time threshold value, the controller will command the charging power supply to terminate the charging operation forcibly, even if certain cell voltage or voltages have not reached the safe reference voltage. As another example, the timer could only count the charging time of the initial constant current charging stage as shown in FIG. 1. When the controller determines that the charging time has reached the corresponding pre-set charging time threshold value, the controller would force the charging power supply to reduce the charging current step by step, even if none of the cell voltages has reached the safe reference voltage. As a still another example, the timer could only count the charging time of the of the constant voltage charging stage, in which the battery array is charged with the raised charging current as shown in FIG. 1. When the controller determines that the charging time has reached the corresponding pre-set charging time threshold value, the controller would force the charging power supply to terminate the charging operation, even if none of the cell voltages has reached the safe reference voltage.

In addition, in the above-mentioned charging operation, the temperatures of the cells could be real-timely monitored by a temperature sensor, and the detected temperature signals could be input to the controller. The controller may compare the input temperatures with the pre-set upper limit temperature value. When the controller determines that the temperatures of the cells have exceeded the upper limit temperature value, the controller 2 would force the charging power supply to terminate the charging operation immediately.

Figure 3:
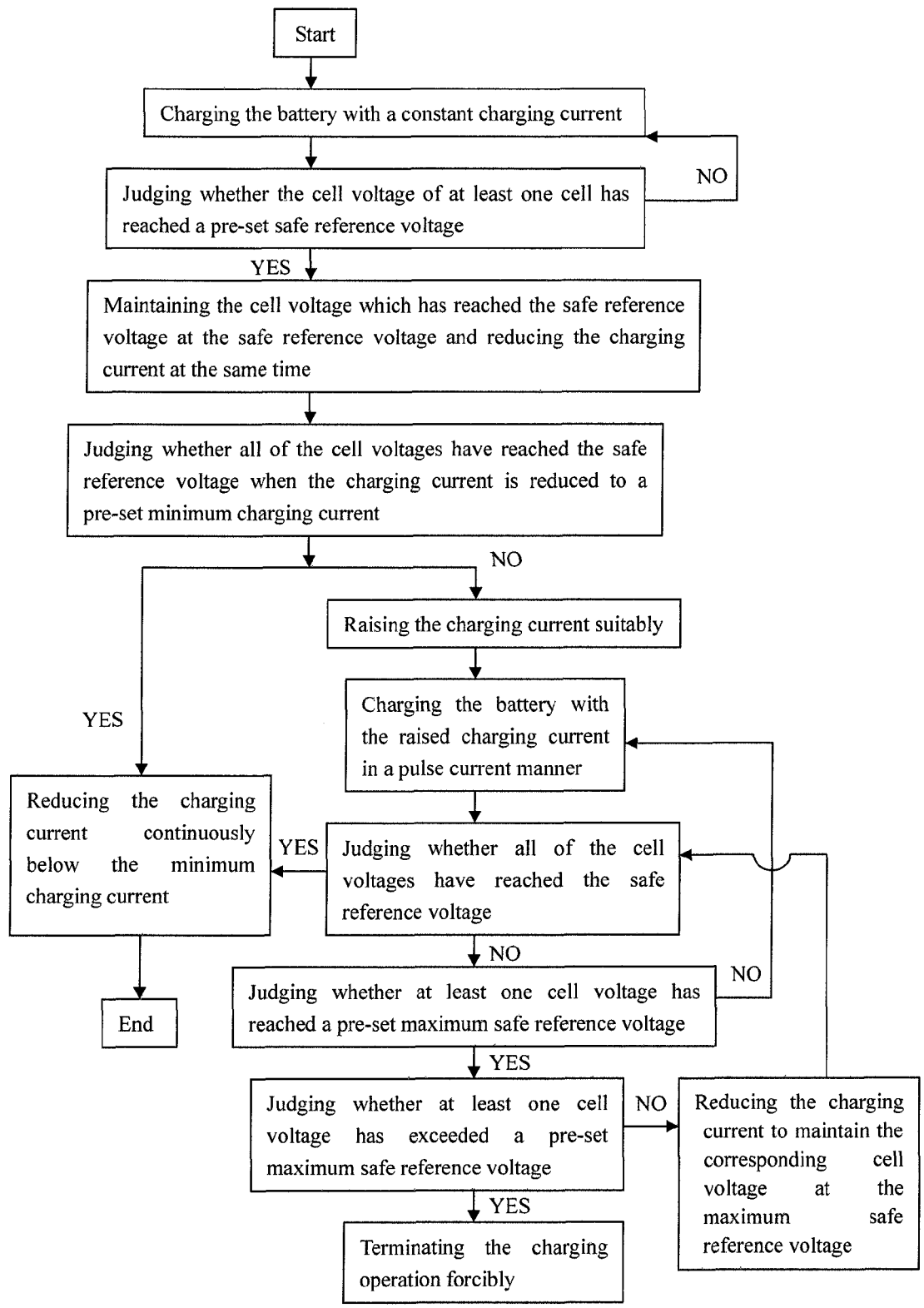
FIG. 3 is a flow diagram of the second embodiment of the charging method according to the present invention.
Figure 4:
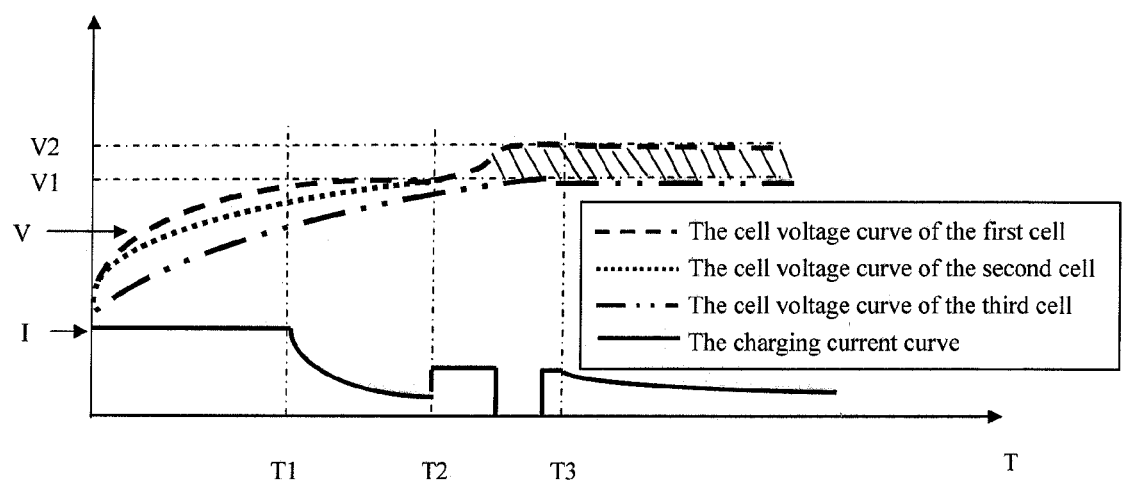
FIG. 4 is a plot illustrating the relation between the cell voltages of the cells and the charging current in the charging method shown in FIG. 3.

FIGS. 3 and 4 illustrate a second embodiment of the present charging method. The second embodiment is similar to the above-mentioned first embodiment. The only difference between the two embodiments is in that, in the second embodiment, when the controller commands the charging power supply to raise the charging current due to its determining that not all of the cells have reached the safe reference voltage, the controller will command the charging power supply to charge the battery array continuously in a pulse current manner, instead of in a constant current manner as the first embodiment. The duty ratio of the pulse current could be set according to the type and characteristics of the cells. For instance, the duty ratio in the example shown in FIG. 4 is set as 2:1, i.e. charging for 60 seconds, and stop for 30 seconds. The advantage of charging the battery array with a pulse current is that, during the charging operation, the cell voltages of the certain cells whose cell voltages have reached the safe reference voltage will not increased rapidly and then exceed the maximum safe reference voltage, and the temperature of the cells will not be too high. Therefore, the cells which have not been fully charged could be continuously charged for plenty of time. Thus, the cell voltages of all the cells will be equalized upon being fully charged without any large discrepancy.

As shown in FIG. 5, after the time T2, the charging current is supply in a pulse current manner rather than in a constant current manner.

Similarly, in the second embodiment, the controller could time the whole of the charging operation and/or the individual stages of the charging operation by using a timer, so that when the charging time has reached the corresponding charging time threshold value pre-set in the controller, the controller would forcibly regulate the charging operation.

In addition, in this embodiment, the temperatures of the cells could also be real-timely monitored by a temperature sensor, and the detected temperature signals could be input to the controller. The controller may compare the input temperatures with the pre-set upper limit temperature value. When the controller determines that the temperatures of the cells have exceeded the upper limit temperature value, the controller 2 would force the charging power supply 1 to terminate the charging operation immediately.

With the above-mentioned charging method and apparatus, the present invention could charge the cells in the battery array while equalizing the cell voltages of the respective cells, without over-charging or under-charging any individual cells. At the same time, the continual degradation (continual over-charging or under charging) of an individual cell due to its changing or discrepancy in characteristics could be avoided. Therefore, the life span of the battery array could be extended. The present invention is adapted for charging all kinds of Lead-acid batteries, particularly ideal for new generation Calcium batteries. It is not suitable for some batteries which is very sensitive for the safe reference voltages, for example: Gel batteries. Comparing with to the other relevant battery charging equalizing apparatus, the present invention offers an obvious cost advantage that only need a little extra cost for leads to detect the voltage of individual cells. The equalizing current regulation is realized via the main charging circuit. Thus, it is provided with a great commercial value in this field.

Although the description of the present invention is made with reference to the preferred embodiments, the present invention is not limited to these embodiments. Various modifications and changes can be made to the invention by those skilled in the art without departing from the spirit and scopes of the present invention.

What is claimed is:

1. A charging method for equalization charging a battery array consisting of at least two cells, comprising the following steps:
   (a) charging the cells of the battery array with a constant charging current;
   (b) detecting the cell voltages of the individual cells to judge whether some of the cell voltages have reached a pre-set safe reference voltage;
   (c) repeating the step (a) when determining that none of the cell voltages has reached the safe reference voltage, or maintaining at least one of the cell voltages at the safe reference voltage and reducing the charging current at the same time when determining that said at least one of the cell voltages has reached the safe reference voltage, wherein the same charging current flows through all of the cells of the battery array;
   (d) judging whether all of the cell voltages have reached the safe reference voltage when the charging current is reduced to a pre-set minimum charging current; and
   (e) reducing the charging current continuously below the minimum charging current and then terminating the charging operation when determining that all of the cell voltages have reached the safe reference voltage, or raising the charging current suitably when determining that at least one of the cell voltages has not reached the safe reference voltage.

2. The charging method according to claim 1, wherein the method further comprises the following steps:
   (f) charging the battery array with said raised charging current in a constant current manner;
   (g) judging whether all of the cell voltages have reached the safe reference voltage; and
   (h) reducing the charging current continuously below the minimum charging current and then terminating the charging operation when determining that all of the cell voltages have reached the safe reference voltage.

3. The charging method according to claim 2, wherein the step (h) further comprises:
   judging whether at least one of the cell voltages has reached a pre-set maximum safe reference voltage when determining that not all of cell voltages have reached the safe reference voltage.

4. The charging method according to claim 3, wherein the method further comprises the following step:
   (i) repeating the step (f) when determining none of the cell voltages has reached the maximum safe reference voltage.

5. The charging method according to claim 4, wherein the step (i) further comprises:
   judging whether at least one of the cell voltages has exceeded the maximum safe reference voltage when determining that at least one of the cell voltages has reached the maximum safe reference voltage.

6. The charging method according to claim 5, wherein the method further comprises the following step:
   (j) reducing said raised charging current to maintain said at least one of the cell voltages which has reached the maximum safe reference voltage at the maximum safe reference voltage and then repeating the step (g) when determining that none of the cell voltages has exceeded the maximum safe reference voltage, and terminating the charging operation forcibly when determining that at least one of the cell voltages has exceeded the maximum safe reference voltage.

7. The charging method according to claim 1, wherein the method further comprises the following step:
   counting the charging time of the whole charging operation and/or several individual stages of the charging operation, and regulating the charging operation forcibly according to the charging condition of the individual cells when the charging time has reached a pre-set charging time threshold value.

8. The charging method according to claim 1, wherein the method further comprises the following step:
   detecting the temperature of the battery array and comparing the detected temperature with a pre-set temperature value, and terminating the charging operation when determining that the detected temperature has exceeded the pre-set temperature value.

9. The charging method according to claim 7, wherein the method further comprises the following step:
   detecting the temperature of the battery array and comparing the detected temperature with a pre-set temperature value, and terminating the charging operation when determining that the detected temperature has exceeded the pre-set temperature value.

10. A charging apparatus for equalization charging a battery array consisting of at least two cells, comprising:
   a charging power supply for supplying electric energy to the battery array;
   a plurality of voltage signal detection leads; and
   a controller which is connected to the charging power supply and is connected to the respective cells of the battery array via the voltage signal detection leads to detect the cell voltages of the respective cells during the charging operation,
   wherein a safe reference voltage and a maximum safe reference voltage are pre-set in the controller, and the controller compares the detected cell voltages with the safe reference voltage and the maximum safe reference voltage, to control the charging power supply and in turn control the charging operation according the result of the comparison, and
   wherein the control of the controller to the charging power supply comprises:
   maintaining at least one of the cell voltages at the safe reference voltage and reducing the charging current at the same time when determining that said at least one of cell voltages has reached the safe reference voltage, wherein the same charging current flows through all of the cells;
   commanding the charging power supply to raise the charging current suitably and charge the battery array with said raised charging current when the charging current is reduced to a pre-set minimum charging current and not all of cell voltages have reached the safe reference voltage.

11. The charging apparatus according to claim 10, wherein the battery array is charged with said raised charging current in a constant current manner.

12. The charging apparatus according to claim 10, wherein the control of the controller to the charging power supply further comprises:
   commanding the charging power supply to reduce the charging current continuously below a pre-set minimum charging current and then terminating the charging operation when determining that all of the cell voltages have reached the safe reference voltage; and
   commanding the charging power supply to reduce the charging current to maintain at least one of the cell voltages at the maximum safe reference voltage when determining that said at least one of cell voltages has reached the maximum safe reference voltage.

13. The charging apparatus according to claim 12, wherein the control of the controller to the charging power supply further comprises:
   commanding the charging power supply to terminate the charging operation immediately when determining that at least one of the cell voltages has exceeded the maximum safe reference voltage.

14. The charging apparatus according to claim 10, wherein the controller further comprises a timer, said timer counts the charging time of the whole charging operation and/or several individual stages of the charging operation, and the controller regulates the charging operation forcibly according to the comparison result between said charging time and a pre-set charging time threshold value.

15. The charging apparatus according to claim 10, wherein the apparatus further comprises a temperature sensor, said temperature sensor is provided near the battery array to monitor the temperature of the battery array during the charging operation.

16. The charging apparatus according to claim 14, wherein the apparatus further comprises a temperature sensor, said temperature sensor is provided near the battery array to monitor the temperature of the battery array during the charging operation.

17. The charging method according to claim 1, wherein the method further comprises the following steps:
   (f) charging the battery array with said raised charging current in a pulse current manner;
   (g) judging whether all of the cell voltages have reached the safe reference voltage; and
   (h) reducing the charging current continuously below the minimum charging current and then terminating the charging operation when determining that all of the cell voltages have reached the safe reference voltage.

18. The charging apparatus according to claim 10, wherein the battery array is charged with said raised charging current in pulse current manner.

* * * * *